(12) United States Patent
Fritz et al.

(10) Patent No.: US 8,740,427 B2
(45) Date of Patent: Jun. 3, 2014

(54) OPTIMAL LIGHT COUPLING FOR REAR VIEW DEVICES

(75) Inventors: Daniel Fritz, Stuttgart (DE); Arne Schmierer, Kircheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 185 days.

(21) Appl. No.: 13/227,559

(22) Filed: Sep. 8, 2011

(65) Prior Publication Data
US 2012/0057362 A1 Mar. 8, 2012

(30) Foreign Application Priority Data
Sep. 8, 2010 (EP) .................................. 10175805

(51) Int. Cl.
*B60Q 1/26* (2006.01)
(52) U.S. Cl.
USPC .......................................... 362/494; 362/555
(58) Field of Classification Search
USPC ............ 362/555, 307, 311.1, 296.01, 311.02, 362/299
See application file for complete search history.

(56) References Cited

U.S. PATENT DOCUMENTS

| | | | |
|---|---|---|---|
| 6,572,411 B1 * | 6/2003 | Aeschbacher et al. ... | 439/620.21 |
| 7,163,327 B2 * | 1/2007 | Henson et al. ................ | 362/554 |
| 7,275,849 B2 * | 10/2007 | Chinniah et al. .............. | 362/555 |
| 7,473,013 B2 * | 1/2009 | Shimada ........................ | 362/327 |
| 7,506,998 B2 * | 3/2009 | Ansems et al. ............... | 362/245 |
| 7,874,714 B2 * | 1/2011 | Yoneda et al. ................ | 362/555 |
| 8,303,146 B2 * | 11/2012 | Kazaoka et al. .............. | 362/494 |
| 2002/0080615 A1 | 6/2002 | Marshall et al. | |
| 2003/0147254 A1 * | 8/2003 | Yoneda et al. ................ | 362/551 |
| 2006/0050526 A1 * | 3/2006 | Ikeda et al. ................... | 362/555 |
| 2006/0291245 A1 * | 12/2006 | Shimada ....................... | 362/612 |
| 2007/0279904 A1 * | 12/2007 | Tasch et al. .................. | 362/235 |
| 2008/0030974 A1 * | 2/2008 | Abu-Ageel .................... | 362/19 |
| 2008/0130137 A1 * | 6/2008 | Angelini et al. .............. | 359/708 |
| 2008/0291683 A1 | 11/2008 | Chinniah et al. | |
| 2010/0053973 A1 * | 3/2010 | Shastry et al. ........... | 362/296.05 |
| 2011/0058385 A1 * | 3/2011 | Kazaoka et al. .............. | 362/540 |

FOREIGN PATENT DOCUMENTS

| | | |
|---|---|---|
| DE | 102005019093 | 10/2006 |
| EP | 0858932 | 8/1998 |
| EP | 1120312 | 8/2001 |
| EP | 1288562 | 3/2003 |

OTHER PUBLICATIONS

European Search Report for application No. EP 10 17 5805 dated Feb. 4, 2011.

* cited by examiner

*Primary Examiner* — Julie Bannan
(74) *Attorney, Agent, or Firm* — Reising Ethington PC

(57) ABSTRACT

The invention relates to a device for optimal coupling of light into a light conductor in an illuminating element in a vehicle rear view device, which comprises a light conductor with a coupling surface. The light conductor is placed at a distance from a TIR lens and a light source of at least one LED. The LED protrudes into a recess of the TIR lens, which includes the LED.

15 Claims, 4 Drawing Sheets

OPTIMAL LIGHT COUPLING FOR REAR VIEW DEVICES

The invention is based on a priority patent application EP 10175805.0 which is hereby incorporated by reference.

BACKGROUND ART

1. Field of the Invention

The invention relates to a device for optimal coupling of light into at least one light conductor in an illuminating element in a vehicle exterior mirror or a vehicle rear view device, such as a camera, with limited installation space in a vehicle.

2. Description of the Related Art

Conventional exterior mirrors have a design allowing the mirror head to be folded backwards in relation to the mirror base, by hand or driven by a motor, in the direction of movement of the vehicle. In addition, the mirror glass bracket can normally be positioned in the mirror head from the inside of the vehicle. A perfect view is thus ensured for the driver, which results in better road safety. Many exterior mirrors comprise an indicator lamp, which is provided on the front side of the mirror housing in the direction of movement. For road users who are next to or behind the exterior mirror, the indicator lamp can generally not be seen, or only insufficiently. Therefore, additional LEDs which radiate along the direction of travel, are used, and are integrated on the outermost edge of the exterior mirror in the indicator.

According to ECE regulations, an additional indicator light in the exterior mirror should light up a region beginning from 5° from the longitudinal axis of the vehicle, up to 60° to the longitudinal axis of the vehicle in the opposite direction of movement. The light intensity in this region, which is regulated by law, is defined in the process and must be achieved.

A variety of solutions for indicators in the exterior mirror is known from the prior art. Here, indicator modules are integrated into the housing of an exterior mirror. According to the design, these indicator modules contain fibre optic cables, reflectors, printed circuit boards, lenses and cover glass and illuminants. LEDs are increasingly used as illuminants due to the known advantages.

In EP 1120312, an exterior mirror with an indicator is known, which comprises a light module, in which a variety of LEDs shine through openings of a reflector. The LED, which is located on the outermost edge of the exterior mirror, has a radiating direction, which corresponds to the legal regulations on the radiation characteristics. The beam-forming is produced by the reflector. The whole light module is clipped into the housing of the exterior mirror, and is electrically contacted by a plug connection. The construction of a lighting module for the indicator is time-consuming and expensive, since a variety of LEDs are attached along an elongated lighting module.

The use of light guide technology lends itself to illuminating an indicator in an exterior rear view mirror, since the installation space in the exterior rear view mirror is limited, and the light emission can be achieved aesthetically with a light conductor, whereby the coupling of the light takes place on an end surface of the light conductor.

EP0858932, for example, is to be named as the prior art, which describes a design of a light conductor in a light module for a mirror indicator. Differing embodiments are also suggested for coupling the light in the light conductor of the mirror indicator. The problem in this process is having enough light available at the end of the light conductor for fulfilling the legal requirements.

So-called TIR (Total Internal Reflection) lenses are also suggested for coupling the light. These TIR lenses comprise a variety of faceted structures, which internally reflect the light, and lead to parallelising the light as a result. A plane, flat light conductor is known in U.S. Pat. No. 5,806,955, into which the light is coupled by several TIR lenses, as well as an elongated light conductor, which comprises a TIR structure on its coupling surface.

US 20080291683 shows a TIR lens, of which the irradiation surface 20 includes and surrounds the dome-shaped lens of an LED. In the process, the TIR lens is attached above the level of the LED, as can also be seen in FIGS. 1 and 1A. In the schematic representation of FIG. 3, the irradiation point is also surrounded by 180 degrees.

SUMMARY OF THE INVENTION

In order to further improve the coupling by using TIR lenses, and also to obtain an optimal use of the radiated light within the limited installation space conditions of a vehicle indicator, the invention suggests using a specific configuration of a TIR lens, which effectively includes the luminous LED. Due to the spatially complete perimeter of the LED with the TIR lens, the strength of light of the LED can efficiently pass into the light conductor, and thus meet design requirements as well as the legal minimum light-strength in the decoupling region.

Advantages of the invention are explained in more detail in the subsequent description. The examples selected mainly include the use of the device for illuminating an indicator. However, the device for coupling light can also be applied in other illuminated elements of the vehicle mirror. Due to the small installation space, the solution according to the invention can also be applied in other rear view solutions on the vehicle, such as a camera.

DETAILED DESCRIPTION OF THE DRAWINGS

Figure 1:
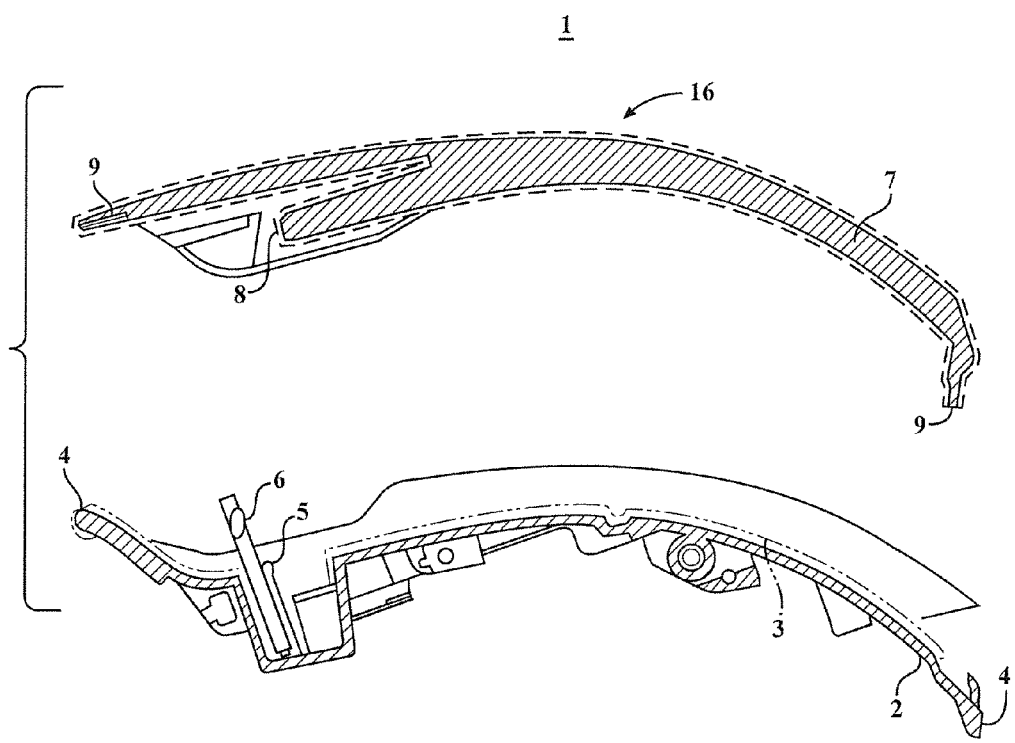
FIG. 1 shows a typical embodiment of a mirror indicator.

FIG. 1 shows a schematic drawing of an indicator module, in a way preferably used in an exterior mirror on a motor vehicle. The indicator of the exterior mirror in this example consists of two significant components, which form an indicator module 1. The indicator module 1 is built into an exterior mirror, whereby the indicator is situated in the exterior mirror housing and extends along the exterior contour of the exterior mirror housing. A rear housing wall 2 of the indicator module serves for receiving a reflector 3, if one is installed in the module, and a printed circuit board 5. The printed circuit board 5 serves for provision of the LED or several LEDs, and bears the control electronics. The printed circuit board is connected to the on-board system of the car by direct contact or via a plug. The rear housing wall 2 of the indicator module is connected to a light window 7, which seals the module outwards and which is translucent.

On the printed circuit board 5, an LED 6 is shown, for example, which is positioned in such a way that the LED can couple light on the front side 8 of the light conductor 7, after the assembly of both main components. In the embodiment shown, the light window has a one-part form, which integrally includes a light conductor. The rear housing wall 2 and the light window 7 are joined together, e.g. welded, at their exposed ends 4, 4' and 9, 9'. Light conductors, which are integrated in a light window and designed in a one-part form, have a double function, namely to conduct the light and to close the indicator module in a watertight and dust-tight manner. The integrated solution thus presents a greater challenge for the design of the light-conducting properties, but reduces the number of parts to be produced and the cost of assembly.

In alternative embodiments, light conductors are placed and fixed in the indicator module as individual components, and a separate lamp lens seals the module.

The invention can also be used in mirror indicators with a modified construction, as long as at least one light conductor is available.

Figure 2:
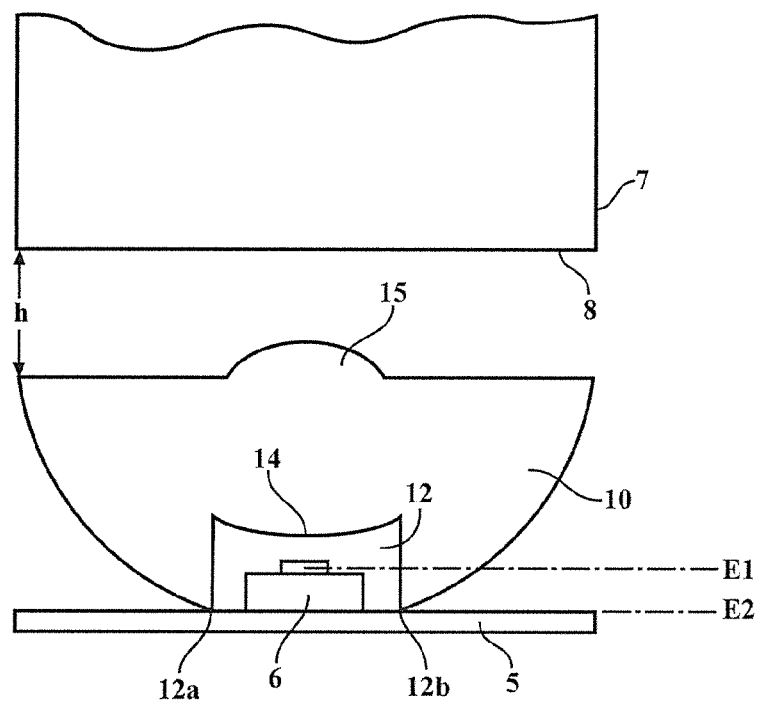
FIGS. 2 and 3 show the embodiment of the coupling according to the invention.
Figure 3:
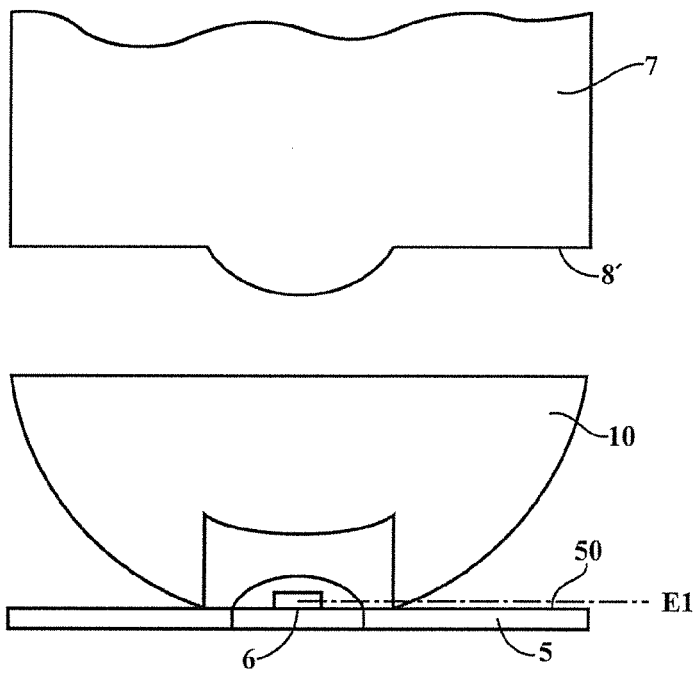
Figure 6:
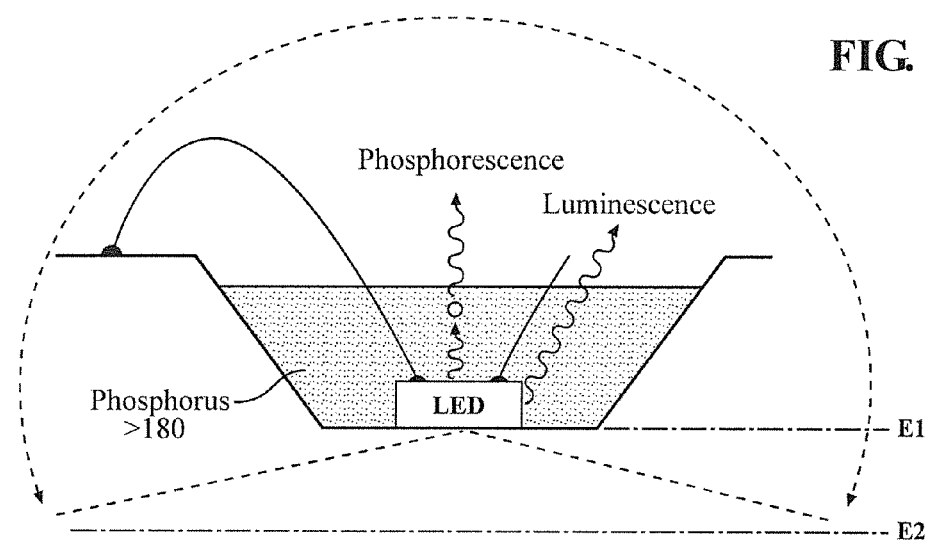
FIG. 6 shows a design of an LED

The device according to the invention for coupling into the light conductor of the mirror indicator is described in FIGS. 2 and 3. A TIR lens 10 comprises a recess 12, into which an LED 6 protrudes. The example in FIG. 2 shows an LED which is designed as an SMT chip. These LEDs are produced with or without a plastic dome and are soldered to a printed circuit board 5 by means of at least two contacts. An LED, as shown in more detail in FIG. 6, is used in FIG. 2. An LED of this type comprises a height from 0.5 to 5 mm above the printed circuit board 5.

The recess 12 of the TIR lens according to the invention comprises the whole area of the optical emission, which appears above the semiconductor layer E1, in which the recess 12 extends to the printed circuit board 5 and thus to the height E2 relative to the printed circuit board. The semiconductor structure, specifically the p-n junction of the diode, is thus entirely surrounded at the height E1-E2 by the recess in the TIR lens. In this embodiment, the TIR lens comprises a hemispherical body, in which the recess is designed as a cylindrical recess.

In the example, the TIR lens comprises in its recess 12 a convex lens structure 14, which also collects light. This convex lens can be supported in an embodiment by a further lens 15, which is arranged on the exit surface of the TIR lens 10.

FIG. 3 shows an embodiment with an LED, which is mounted in the through-hole process. Here, the moulded plastic dome of the LED 6 is led through an opening of the printed circuit board. The radiating p-n junction is then also situated just above the surface E2 of the printed circuit board 5. The fitted TIR lens 10 thus comprises the radiating area of the LED on three sides. In other words, the recess 12 of the TIR lens comprises a solid angle of more than 180 degrees, in relation to the level E1 of the semiconductor material of the LED. The construction of an LED is schematically shown in FIG. 6, whereby the total electrical connections and the housing are not visible. The TIR lens encompasses the reflector of the LED and extends under the level E1 to E2, so that the solid angle included is more than 180°.

The TIR lens is attached to the printed circuit board in the contact area 12a and 12b, in order to achieve secure positioning of the LED in relation to the lens. In the process, the lens can be stuck or connected; any other possibility for fixing known to the expert is also possible.

The coupling of the radiated light of the TIR lens takes place via an air gap of the height h. This air gap is a parameter for optimal illumination of the light conductor. The second change of the refractive index from the TIR lens medium to air and from air to the light conductor medium facilitates optimal alignment. The light conductor and TIR lens are preferably moulded from optically clear plastic, whereby the materials used, such as PMMA, have 1.49, and also plastics up to the refractive index 1.6 and higher, are available.

Figure 4:
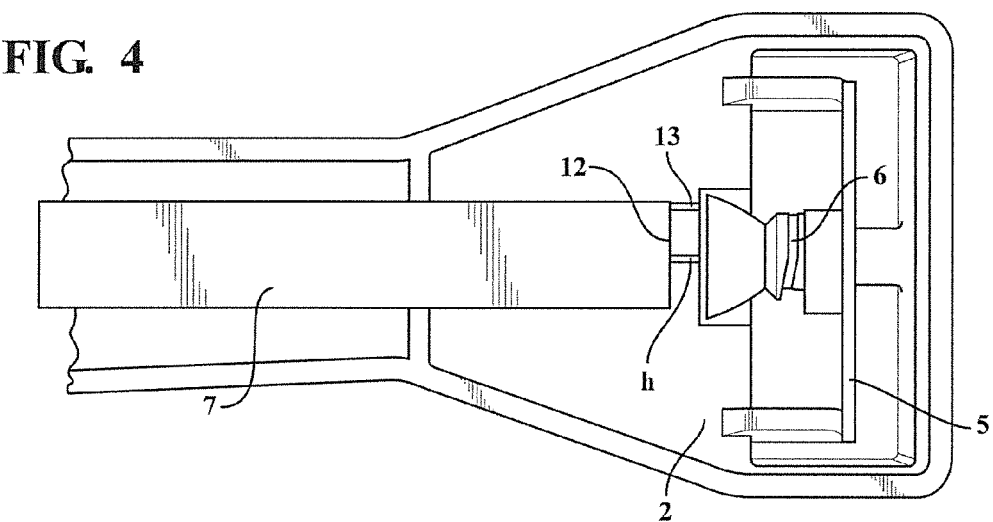
FIG. 4 shows an example with a special LED

An exemplary construction is here shown in FIG. 4. The rear housing wall 2 of the indicator module is a basis for a printed circuit board 5, on which the LED is mounted. The LED 6 is an LED with a moulded TIR lens. In this embodiment, the light conductor lies with a plane surface 8 parallel to the exit surface 13 of the LED with a moulded TIR lens.

An advantageous embodiment selects the diameter of the light conductor 7 corresponding to the diameter of the LED with TIR lens. In the process, the light conductor is positioned at a distance h from the TIR lens 10 of the LED, which is between 0 and 10 mm. In order to capture the total radiated light, the dimension of the light conductor can also be greater than the diameter of the TIR lens.

Due to the radiation characteristics of the LED with the TIR lens, a light conductor with radius R covers all radiated beams, when the radius of the light conductor, in relation to the distance between the optical components, follows the rule:

$$\text{Delta } R = h \cdot \tan(\text{angle of radiation}),$$

whereby delta R is the increase of the radius of the light conductor in relation to the distance.

At a typical angle of radiation of 5°, the radius of the light conductor would be positioned at a distance of 4 mm from the TIR lens, in order to increase by 0.7 mm in relation to the radiating surface of the TIR lens, in order to couple light effectively.

In alternative embodiments, geometries other than a circular coupling geometry are possible. For the mirror indicator, light conductors with a plane configuration are used as light windows, as well as light guide bars with an elliptical or rectangular cross-section.

If the cross-section is sufficiently large, the majority of the available light is coupled by the TIR lens.

Due to new developments in technology of LEDs, it is possible to design a mirror indicator, which is simply designed and optimally illuminated by using special LEDs.

Special LEDs are known in WO 2005/034251 and suggested for use in the automotive industry. For this, a first, internal LED part body is surrounded and engaged behind in an area by a second, external LED part body. The process facilitates a form-locking, secure connection between two separate steps, e.g. LED part bodies which can be produced temporally and spatially separate from each other, whereby a part body engages behind the other, area by area.

Figure 5:
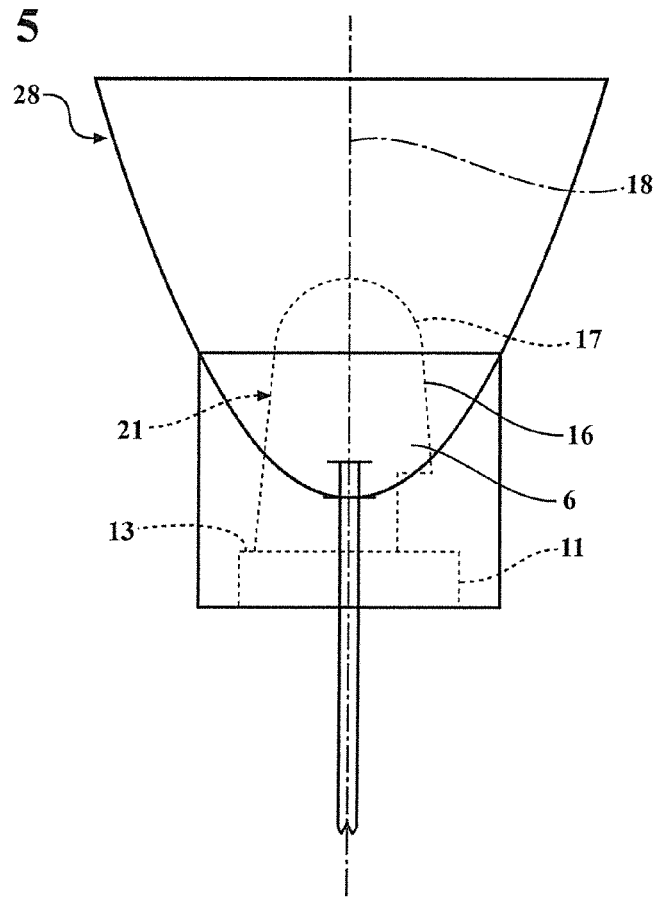
FIG. 5 shows the construction of an LED used

FIG. 5 shows this prior art with an LED, whose light conducting body is produced by injection moulding, for example, in at least two separate production steps. In a first step, an LED part body 21 is produced. The latter has a geometric form, for example, which essentially consists of three body geometries arranged one above the other. The first body geometry is a short, at least approximately straight cylinder 11. The second body geometry is a truncated cone 16, arranged on the upper front surface 13 of the cylinder 11, which tapers away from the cylinder 11. The third body geometry is a spherical cap 17 or a nearly hemispherical cap, which is positioned on the upper, smaller front surface of the truncated cone. Concentrically arranged around the central axis 18, a fourth body 20 extends in the form of an open paraboloid.

Since the external LED part bodies 20 are overmoulded around the other bodies 21 in an injection moulding process, a fused unit without gas inclusions developing in the corresponding material combination.

An LED of this type can serve as a base for a light source of the mirror indicator. In a similar process, an LED is produced, which consists of a cylindrical base, which is directly overmoulded with a TIR lens. In the process, the TIR lens replaces the truncated cone 16, the lamp cap 17 and the exterior body 20. The TIR lens is produced as a first injection-moulded part, and the LED is subsequently overmoulded with the cylinder 11. The advantage is that no further optical characteristic apart from the moulded TIR lens must be used, in order to couple light into the light conductor.

In the process, the light yield in a light conductor always depends on how parallel the beams of the LED are when they meet on the coupling surface of the light conductor. The radiation characteristic of a normal LED extends over the total solid angle of 180° above its mounting surface. These radiation characteristics are already influenced by the internal reflector of the LED, and the optical path is bundled. The straighter the radiation occurs, the easier it is to couple the light into a light conductor. The example of FIG. 6 shows an LED consisting of a light-radiating semiconductor, which is mounted on the base of a reflector. For production of a white LED, a phosphorescent substance is also used, which leads to wavelength shifts and to the widening of the spectrum. The level E1 denotes the lower limit of the semiconductor of the LED. The level E2 lies underneath, and the solid angle included by the recess of the TIR lens is thus greater than 180°.

Even without the standard reflector, coupling of the light during use of the TIR lens according to the invention is also possible.

Figure 7:
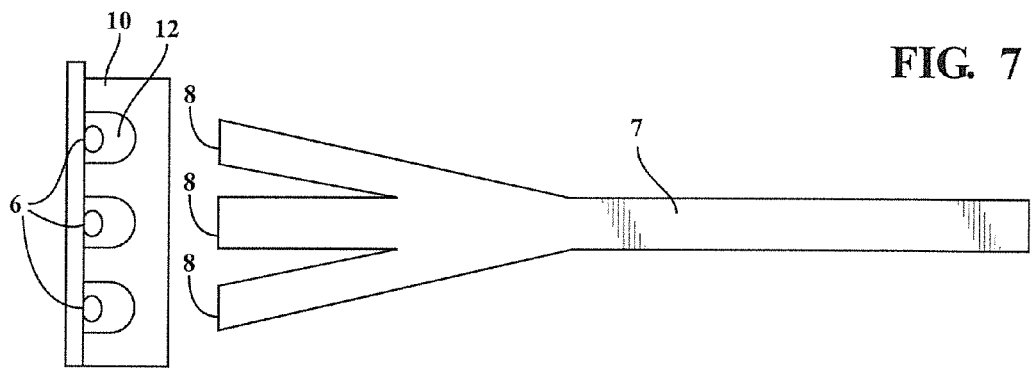
FIG. 7 shows a light conductor with several coupling surfaces

FIG. 7 shows an expansion of the invention idea for a light conductor solution with several coupling points 8. A TIR lens, which comprises several recesses 12 for LEDs 6, is arranged in front of the light conductor and couples light into the structure. A solution of this type is advantageous, if an indication or warning light is to be implemented. The LEDs then have a different colour. According to the information to be shown, a green signal light or a red signal light can thus be fed in, and transported to the end point of the light conductor 7. In this way, a warning light signal can be implemented.

Figure 8:
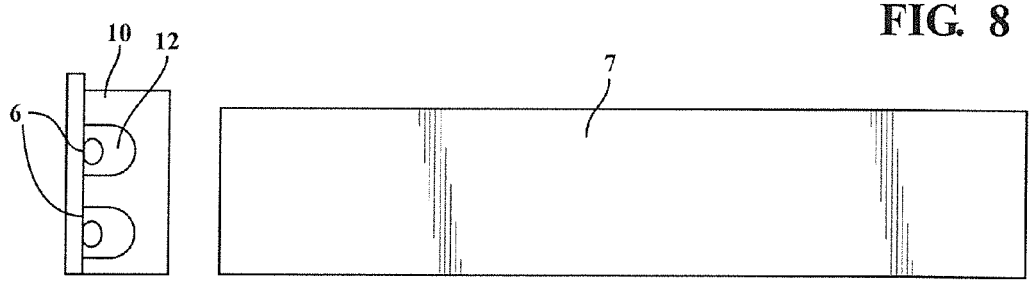
FIG. 8 shows a TIR lens with several recesses

A design of the TIR lens with several recesses is also shown in FIG. 8. Here the coupling is carried out on only one coupling surface 8 of a light conductor, whilst the TIR lens again comprises several recesses 12.

A solution of this type is advantageous for use as ambient lighting mounted on the exterior mirror or on the vehicle. Normal indicators can also be provided with light in this way.

Through use of a TIR lens with several recesses, the light of several LEDs is combined, and an optimal illumination of the light conductor is achieved.

The device suggested for coupling light is also suggested for use in camera systems on the vehicle. If one replaces an exterior mirror by a camera module, the problem of installation space is exacerbated. Each type of signalling and illumination, whether normal indicators, an ambient lighting or a warning signal, must manage with the smallest installation space. The solution according to the invention here shows progress.

The solution is also advantageous for an interior mirror as a rear view device. An interior mirror can also contain warning signals or an illumination as a reading lamp or as ambient illumination.

The invention claimed is:

1. Vehicle rear view device with an illuminating element, said vehicle rear view device comprising:
    a light source emitting light, said light source consisting of at least one LED having a semiconductor layer;
    at least one light conductor in the illuminating element in the vehicle rear view device, with the light conductor receiving the light emitted by the light source, whereby the light conductor includes at least one coupling surface, through which the emitted light enters into the at least one light conductor; and
    at least one TIR lens disposed between the at least one light conductor and the light source, wherein the at least one LED protrudes into a recess of the at least one TIR lens, the at least one recess of the TIR lens includes the at least one LED in a solid angle of at least 180°, and the TIR lens extends to below the semiconductor layer of the LED and to a circuit board to which the LED is soldered such that the recess of the TIR lens encompasses the whole area of optical emission of the LED to be guided to the at least one light conductor, the coupling surface of which faces the TIR lens.

2. Vehicle rear view device according to claim 1, characterized in that the recess of the TIR lens forms a convex lens.

3. Vehicle rear view device according to claim 1, characterized in that the recess is a cylindrical cavity.

4. Vehicle rear view device according to claim 1, characterized in that the TIR lens extends to below the level of the LED semiconductor.

5. Vehicle rear view device according to claim 1, characterized in that the TIR lens comprises a plane decoupling surface.

6. Vehicle rear view device according to claim 1, characterized in that the TIR lens comprises a decoupling surface with a convex lens.

7. Vehicle rear view device according to claim 1, characterized in that the TIR lens is attached to the surface of a printed circuit board.

8. Vehicle rear view device according to claim 1, characterized in that the light conductor is used in an illuminating element of the vehicle rear view device such as in an indicator module of a direction indicator lamp, an ambient lighting module or in a warning signal.

9. Vehicle rear view device according to claim 1, characterized in that the LED is directly overmoulded with a TIR lens.

10. Vehicle rear view device according to claim 9, characterized in that the LED is produced in at least two injection moulding steps, whereby one step includes the injection moulding of the TIR lens.

11. Vehicle rear view device according to claim 1, characterized in that the light conductor comprises a lens structure on its coupling surface.

12. Vehicle rear view device according to claim 1, characterized in that the light conductor comprises several coupling surfaces.

13. Vehicle rear view device according to claim 1, characterized in that the TIR lens comprises several recesses for several LEDs.

14. Vehicle rear view device according to claim 13, characterized in that the light of several LEDs couples into a light conductor.

15. Vehicle rear view device according to claim 13, characterized in that the light of several LEDs couples into a coupling surface of a light conductor in each case.

* * * * *